US009090240B2

(12) United States Patent
Burtch et al.

(10) Patent No.: US 9,090,240 B2
(45) Date of Patent: Jul. 28, 2015

(54) DUAL-CLUTCH TRANSMISSION PREDICTIVE THERMAL PROTECTION

(75) Inventors: Joseph B. Burtch, Lake Orion, MI (US); Sahm Litkouhi, Rochester Hills, MI (US); John E. Marano, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 673 days.

(21) Appl. No.: 13/411,989

(22) Filed: Mar. 5, 2012

(65) Prior Publication Data

US 2013/0231833 A1 Sep. 5, 2013

(51) Int. Cl.
| | |
|---|---|
| G06F 17/40 | (2006.01) |
| G06F 19/00 | (2011.01) |
| B60W 10/02 | (2006.01) |
| F16H 61/12 | (2010.01) |
| F16H 61/688 | (2006.01) |
| B60W 10/113 | (2012.01) |
| B60W 30/184 | (2012.01) |
| F16H 59/72 | (2006.01) |
| F16H 57/01 | (2012.01) |

(52) U.S. Cl.
CPC ............. *B60W 10/02* (2013.01); *B60W 10/113* (2013.01); *B60W 30/1843* (2013.01); *F16H 59/72* (2013.01); *F16H 61/12* (2013.01); *F16H 61/688* (2013.01); *B60W 2510/0291* (2013.01); *B60Y 2300/186* (2013.01); *F16H 2057/014* (2013.01); *F16H 2057/016* (2013.01); *F16H 2059/725* (2013.01); *F16H 2061/124* (2013.01); *F16H 2061/1216* (2013.01); *Y10T 477/6395* (2015.01)

(58) Field of Classification Search
None
See application file for complete search history.

(56) References Cited

U.S. PATENT DOCUMENTS

| | | | | |
|---|---|---|---|---|
| 5,337,866 | A  * | 8/1994 | Sturmer et al. ................ | 477/175 |
| 7,090,617 | B2 * | 8/2006 | Bassler .......................... | 477/180 |
| 7,314,429 | B2 * | 1/2008 | Reibold et al. ................ | 477/177 |
| 2003/0022759 | A1* | 1/2003 | Frotscher ....................... | 477/174 |
| 2006/0040788 | A1* | 2/2006 | Bassler .......................... | 477/71 |
| 2010/0250080 | A1* | 9/2010 | Domae et al. ................... | 701/68 |
| 2011/0024258 | A1* | 2/2011 | Avny et al. ............... | 192/111.12 |
| 2011/0218719 | A1* | 9/2011 | Kirchner .......................... | 701/53 |
| 2012/0191306 | A1* | 7/2012 | Baldwin et al. ................. | 701/51 |
| 2013/0282246 | A1* | 10/2013 | Burtch ............................ | 701/67 |
| 2013/0282247 | A1* | 10/2013 | Burtch ............................ | 701/67 |

\* cited by examiner

*Primary Examiner* — John Q Nguyen
*Assistant Examiner* — Michael Ng
(74) *Attorney, Agent, or Firm* — Quinn Law Group, PLLC

(57) ABSTRACT

A method of managing clutch thermal loads in a multi-speed dual-clutch transmission (DCT) that is paired with an internal combustion engine in a vehicle is provided. The method includes assessing operation of the DCT and ascertaining a mode of operation of a clutch in the DCT. The method also includes predicting, in response to the ascertained mode of operation of the clutch, an amount of time remaining until the clutch reaches a threshold temperature. The method additionally includes ascertaining whether the predicted amount of time remaining until the clutch reaches the threshold temperature is within a predetermined range of time. Furthermore, the method includes activating an indicator configured to signal that the predicted amount of time remaining is within the predetermined range of time. A vehicle having a DCT, an internal combustion engine, and a controller configured to predict thermal loading on a clutch in the DCT is also disclosed.

16 Claims, 2 Drawing Sheets

DUAL-CLUTCH TRANSMISSION PREDICTIVE THERMAL PROTECTION

TECHNICAL FIELD

The disclosure relates to a system and method for predictive thermal protection of clutches in a multi-speed, dual-clutch transmission.

BACKGROUND

Modern vehicles are frequently equipped with multi-speed, dual-clutch transmissions (DCT) as part of the subject vehicle's powertrain. Such DCTs are favored for their increased mechanical efficiency in comparison with typical, torque-converter equipped automatic transmissions. Additionally, DCTs are often preferred over typical automated manual transmissions for the capability of DCTs to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e., a vehicle employing two or more distinct power sources, such as an engine and an electric motor, for transmitting propulsion energy to the subject vehicle's driven wheels.

During operation of a vehicle equipped with a DCT, significant amounts of heat or thermal loads may be generated within the DCT clutches due to clutch slip used to launch the vehicle and during gear shifts. When such loads exceed specific thresholds, performance and durability of the DCT clutches, as well as general performance of the DCT and the vehicle, may be adversely affected.

SUMMARY

A method is disclosed for managing clutch thermal loads in a multi-speed dual-clutch transmission (DCT) that is paired with an internal combustion engine in a vehicle. The method includes assessing operation of the DCT and ascertaining a mode of operation of a clutch in the DCT. The method also includes predicting, in response to the ascertained mode of operation of the clutch, an amount of time remaining until the clutch reaches a threshold temperature. The method additionally includes ascertaining whether the predicted amount of time remaining until the clutch reaches the threshold temperature is within a predetermined range of time. Furthermore, the method includes activating an indicator configured to signal that the predicted amount of time remaining until the clutch reaches the threshold temperature is within the predetermined range of time.

The threshold temperature may be a first value indicative of the clutch being overheated, with operation of the DCT regulated such that energy input to, as well as the thermal loading on, the clutch is reduced when the predicted amount of time remaining until the clutch reaches the first value is within the predetermined range of time.

The act of regulating operation of the DCT such that energy input to the clutch is reduced may include disengaging the clutch.

The threshold temperature may be a second value indicative of the clutch being substantially cool, i.e., being capable of withstanding additional energy input. In such a case, the method may additionally include regulating operation of the DCT to permit additional energy input to the clutch when the temperature of the clutch is reduced below the second value.

Each of the acts of assessing operation of the DCT, ascertaining a mode of operation of a clutch in the DCT, predicting the amount of time remaining until the clutch reaches a threshold temperature, ascertaining whether the predicted amount of time remaining until the clutch reaches the threshold temperature is within the predetermined range of time, and activating the indicator may be accomplished via a controller.

The act of predicting the amount of time remaining until the clutch reaches the threshold temperature may include employing the Newton-Raphson method to approximate the amount of time.

The subject clutch may be one of an odd-ratio clutch and an even-ratio clutch. The indicator may be at least one of an audible signal and a visual display. Additionally, the visual display may include a communicated request for an operator of the vehicle to at least one of i) increase vehicle speed or apply the vehicle brake, and ii) apply and hold vehicle brake. Furthermore, the visual display may include a communicated request for an operator of the vehicle to release the vehicle brake. The indicator may additionally include a coded message stored in the controller and configured to be retrieved on demand.

A vehicle having a DCT, an internal combustion engine, and a controller configured to predict thermal loading on a clutch in the DCT is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

A dynamically-shiftable multi-speed dual-clutch transmission (DCT) may be employed as part of a powertrain for a vehicle in order to further enhance the vehicle's efficient use of non-renewable sources of energy, such as fossil fuels. Such a DCT may be provided for a vehicle having a conventional powertrain employing solely a single internal combustion engine for powering the vehicle, or a hybrid type of a powertrain, wherein the vehicle may be powered by an engine, an electric motor, or a combination of the two.

As used herein, the term "dynamically-shiftable" relates to employing a combination of two friction clutches and several dog clutch/synchronizers to achieve "power-on" or dynamic shifts by alternating between engagement of one friction clutch and the other. Additionally, "dynamic shifting" means that drive torque is present in the transmission when a clutched shift to an oncoming speed ratio is made. Generally, the synchronizers are physically "pre-selected" for the oncoming ratio prior to actually making the dynamic shift. As will be readily understood by those skilled in the art, prior to making a "dynamic shift", synchronizers are "pre-selected" to the necessary positions of both the oncoming and off-going ratios prior to actually shifting the torque path from one clutch to the other. The pre-select condition is postponed as long as possible to minimize spin losses because pre-selecting the next ratio forces a speed difference in the open, i.e., not engaged, clutch. This particular gear arrangement allows the combination of torque-transmitting mechanisms for any ratio and its neighboring ratio (i.e., ratio N and ratio N+1) without obtaining a mechanical tie-up in the transmission.

Figure 1:
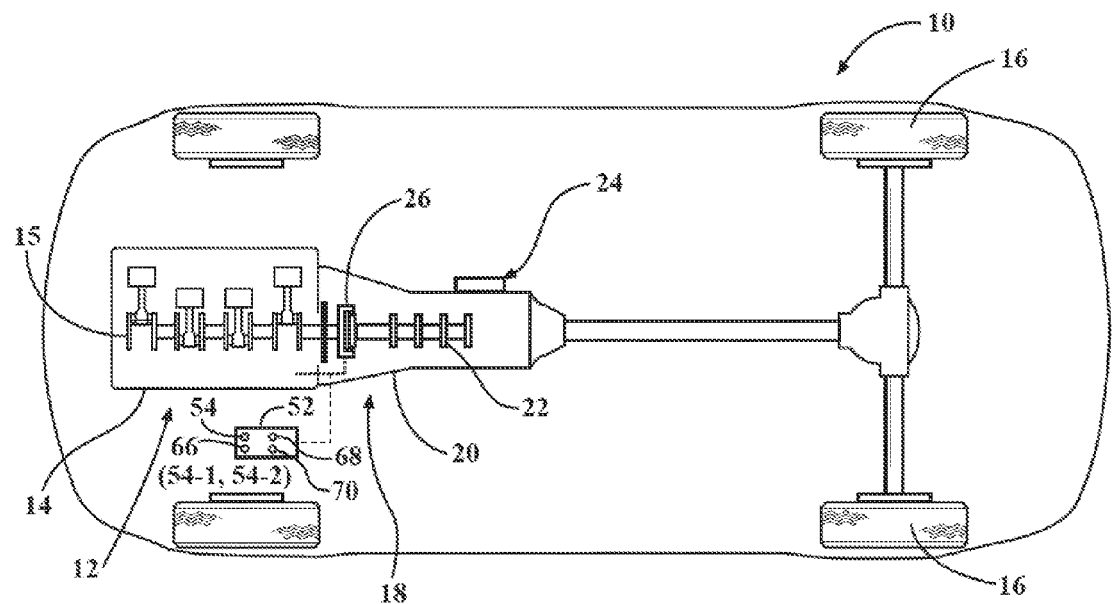
FIG. 1 is a schematic representation of a vehicle powertrain having an internal combustion engine and a dynamically-shiftable, dual-clutch transmission (DCT).

Referring to FIG. 1, a vehicle 10 having a powertrain 12 is depicted. The powertrain 12 includes an internal combustion engine 14 configured to generate torque, drive wheels 16 configured to interface with a road surface, and a DCT 18 operatively connected to the engine 14 and configured to transmit engine torque to the drive wheels. Although not specifically shown, as noted above, the powertrain 12 may be configured as a hybrid type and additionally include an electric motor.

The engine 14 utilizes a crankshaft 15 for converting reciprocal motion into rotational motion, as is understood by those skilled in the art. The DCT 18 is paired with the engine 14 at an engine-transmission interface using any appropriate means, including fasteners (not shown) such as threaded screws and dowels. The DCT 18 includes a transmission case 20 for housing a geartrain 22 that is configured to provide a predetermined number of selectable gear ratios for connecting the engine crankshaft 15 to the drive wheels 16. The DCT 18 also includes a controls subsystem 24 employed to control operation of a clutch subsystem 26.

Although not specifically shown, the controls subsystem 24 may generally include an electric drive system that is configured to convert DC current of an on-board energy storage device, such as a battery, into AC current for powering a three-phase electric motor. The electric motor may then be employed to drive an electric pump to pressurize a body of control fluid, such as pentosin, through a DCT valvebody that includes a system of valves and solenoids. In turn, the DCT valvebody employs the system of valves and solenoids to direct the pressurized fluid to regulate operation of the clutch system 26.

Figure 2:
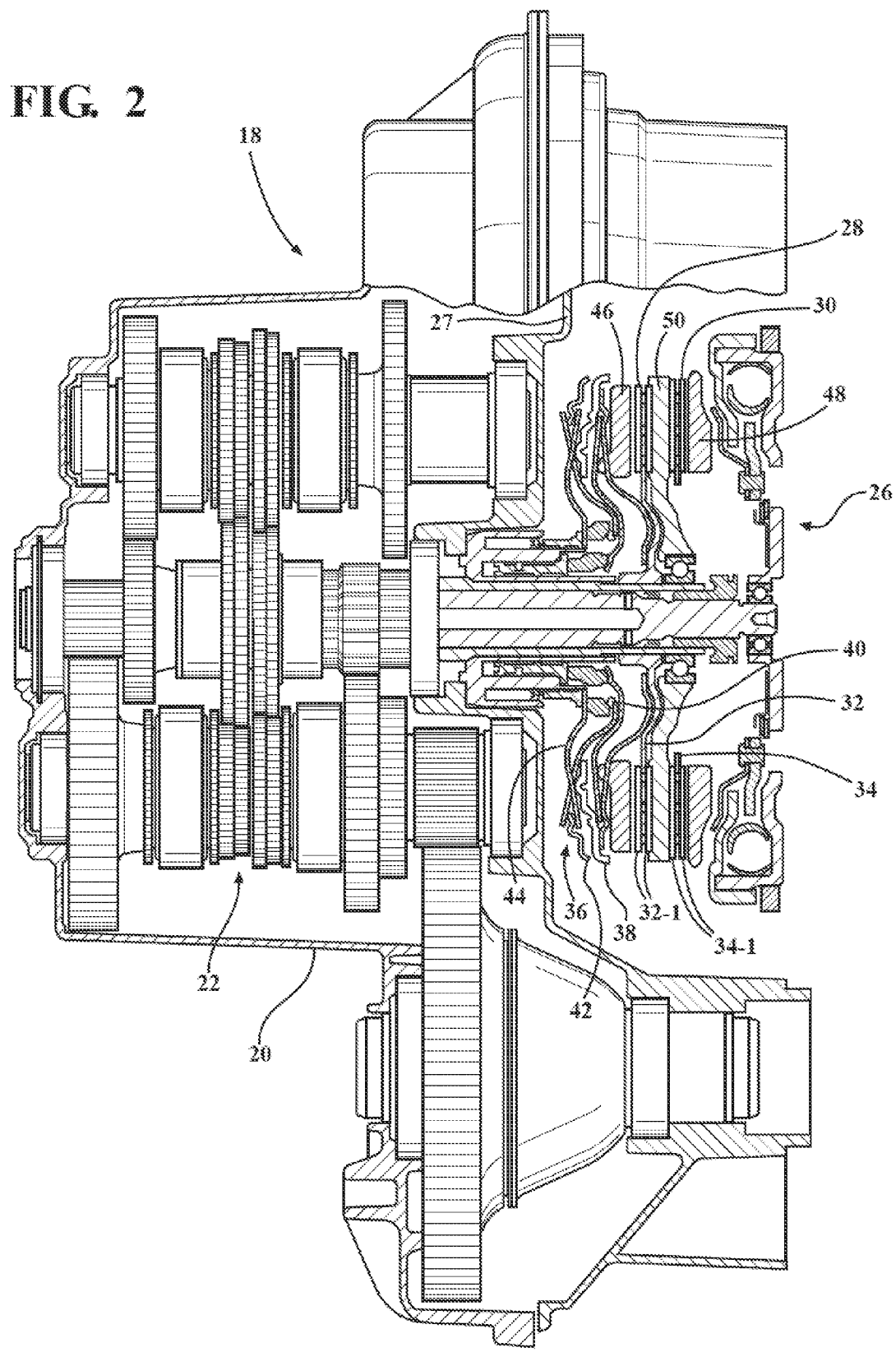
FIG. 2 is a schematic representation of a cross-sectional view of the DCT shown in FIG. 1, specifically illustrating the transmission clutches.

As shown in FIG. 2, the clutch subsystem 26 is located inside a clutch housing 27 and includes dry clutches 28 and 30. As shown, the clutch 28 is an even-ratio clutch, and the clutch 30 is an odd-ratio clutch. The clutches 28, 30 are configured to select the particular drive gear ratio in the DCT 18. Specifically, the clutch 28 includes a clutch plate 32 having friction facings 32-1, while the clutch 30 includes a clutch plate 34 having friction facings 34-1. The DCT 18 also includes a clutch cover 36, which has a portion 38 employed to actuate the clutch 28 via a spring 40 and a portion 42 employed to actuate the clutch 30 via a spring 44. The clutch 28 also includes a pressure plate 46, while the clutch 30 includes a pressure plate 48.

Additionally, clutches 28 and 30 share a center plate 50, wherein each of the pressure plates 46 and 48 clamp the respective friction facings 32-1 and 34-1 against the center plate 50 through the action of the springs 40 and 44 at a preselected rate to engage the respective clutch. During operation of the DCT 18, when one of the clutches 28, 30 is transmitting engine torque in any particular ratio, the other of the two clutches pre-selects an appropriate synchronizer of the oncoming ratio. The above-described valvebody controls selective engagement of the clutches 28, 30 by directing the control fluid to various solenoids (not shown) that in turn regulate flow of the control fluid to the appropriate clutch.

During operation of the vehicle 10, when the DCT 18 is transmitting engine torque, thermal loading on the clutch subsystem 26 may become excessive, i.e., one or more of the clutches 28, 30 may experience a rapid temperature increase and an over-heat condition. Such thermal loading is frequently the result of clutch slip used to launch the vehicle 10 and during gear shifts of the DCT 18. Consequently, if not addressed, such excessive thermal loading may lead to reduced performance and durability of friction facings 32-1 and 34-1, as well as general performance of the DCT 18 and the vehicle 10. What constitutes excessive thermal loading with respect to the clutches 28, 30 may be based on operating requirements of the DCT 18, as well as on durability limits of the facings 32-1 and 34-1, as well as other components of the respective clutches.

With renewed reference to FIG. 1, the vehicle 10 also includes a controller 52 that may be a dedicated transmission controller configured to regulate operation of the DCT 18, or an integrated powertrain controller configured to regulate operation of the entire powertrain 12. The controller 52 is also programmed with an algorithm and configured to manage thermal loads on clutches 28, 30 in the DCT 18. As part of its managing of the thermal loads on clutches 28, 30, the controller 52 is programmed to assess the operation of the DCT 18, and ascertain whether the engine 14 has been started and the vehicle 10 has been commanded by its operator to go into motion by having the DCT transmit engine power to the drive wheels 16. The controller 52 is also programmed to ascertain what mode of operation each of the clutches 28, 30 is in, in other words, whether each of the clutches is engaged, disengaged, undergoing controlled slip during vehicle launch, or in the process of a hand off from one gear to the next during a gear change.

The controller 52 is also programmed to predict, in response to the ascertained operation of the clutches 28, 30, an amount of time remaining until each clutch reaches a threshold temperature 54. The threshold temperature 54 of the particular clutch 28 or 30 is indicative of the clutch having absorbed sufficient thermal energy to be within a predetermined range of the above-described over-heat condition. Within the meaning of the present disclosure, the threshold temperature 54 may either be a value that corresponds to the clutch 28 or 30 having absorbed excessive thermal loading or one that corresponds to the clutch having cooled down to an acceptable operating temperature after having reached the over-heat condition. Accordingly, a clutch may be considered substantially cool or residing at an acceptable operating temperature if the clutch is capable of withstanding additional energy input. In one embodiment, the threshold temperature 54 may be a temperature value that was previously assessed on or near the friction surface of the pressure plate 46, 48, or 50. In another embodiment, the threshold temperature 54 may be a temperature value that was previously assessed on or near the friction surface of the clutch facings 32-1 or 34-1. The controller 52 may also be programmed with two distinct threshold temperature values, a first threshold value 54-1 indicative of the clutch being overheated, i.e., the over-heat threshold, and a second threshold value 54-2 indicative of the clutch being substantially cool and capable of withstanding additional energy input, i.e., the cool-off threshold. Accordingly, the controller 52 may be programmed to perform a determination of heat transfer for the clutch 28 or 30 in question at a specific instance based on the following mathematical expressions.

An equation 56 shown below represents the temperature "$T^h_c$" of the particular pressure plate 46, 48, or 50 at a specific time instance "k+1":

$$T^h_c(k+1) = T_c(k) + ((Q^*\text{HeatPortion}) - (\text{Heatloss}_{pc}) - (\text{Heatloss}_{cp}))/(Cp_c {}^* \text{Mass}_c)^* \Delta t \quad (56)$$

The term "$T_c(k)$" represents the temperature of the particular pressure plate 46, 48, or 50 at the initial time "k". The term "Q" represents the total amount of heat generated during slippage of the particular clutch 28 or 30. "HeatPortion" is a term representing the amount of heat being shared between the particular pressure plate 46, 48 and the center plate 50 during the engagement of the subject clutch. "Heatloss$_{pc}$" is a term representing the amount of heat lost through conduction to the clutch cover 36 during the subject event. "Heatloss$_{cp}$" is a term representing the loss of heat through conduction to the center plate 50. "Mass$_c$" is a term representing the total mass of the heat sink provided by the particular pressure plate 46, 48, or 50. "Cp$_c$" is a term representing the specific heat of the particular pressure plate 46, 48, or 50. Additionally, "$\Delta t$" is a term representing the amount of time that the particular pressure plate will see an influx of thermal energy. An equation 58 shown below represents cooling convection "$T^c_c$," or the amount of heat lost to the ambient air surrounding the pressure plates 46, 48, and 50 inside the housing 27:

$$T^c_c(k+1) = (T_c(k) - T_h(k))e^{-b^*(\Delta t)} + T_h(k) \tag{58}$$

In the equation 58, the term "b" represents a cooling coefficient, while the term "$T_h(k)$" represents temperature of the air inside the housing 27 at time "k".

Equations 56 and 58 may subsequently be combined and arranged to solve for "$T_c(k+1)$", which is the time required to either overheat or cool down the particular pressure plate 46, 48, or 50, thus arriving at an equation 60:

$$T_c(k+1) = (T_c(k) + \text{Conduction}^* \Delta t - T_h(k))e^{-b^*(\Delta t)} + T_h(k) \tag{60}$$

In order to obtain a solution for the amount of time it will take to reach the threshold temperature 54, represented by the term "$T_c$", of the particular pressure plate 46, 48, or 50, a Newton-Raphson method may be used to manipulate the equation (60). The Newton-Raphson method is a computational approach for finding successively more accurate approximations to the zeros or roots of a real-valued function, and is generally expressed as "$x_{n-1} = x_n(k) - f(x_n)/(f'(x_n))$".

According to the Newton-Raphson method, an initial guess is inputted in to the expression "$x_{n+1} = x_n(k) - f(x_n)/(f'(x_n))$" which is reasonably close to the true root of the underlying function. With the next successive step, the function is approximated by its tangent line, which can be computed using the tools of calculus. Then the x-intercept of the tangent line of the underlying function is computed by using elementary algebra. Thus computed, the x-intercept will typically be a better approximation to the function's root than the original guess. With each successive iteration, the approximation converges on the function's root, and, in many practical applications, within a few such iterations the method achieves the sought result.

To employ the Newton-Raphson method, the term "$T_c(k+1)$" in the equation (58) may be replaced by "$T_c(k+m)$", where "m" represents a specific time step instant when the target temperature "$T_c$" will be reached. Accordingly, the "$f(x_n)$" term of the Newton-Raphson method may be represented by an equation (62):

$$0 = (T_c(k) + \text{Conduction}^* \Delta t^* m) - T_h(k))e^{-b^*(\Delta t^* m)} + T_h(k) - T_c(k+m) \tag{62}$$

Additionally, the "$f'(x_n)$" term of the Newton-Raphson method may be represented by equation (64):

$$(\text{Conduction}^*(1+(-b)(\Delta t^* m)) + (-b)^*(T_c(k) - T_h(k)))e^{-b^*(\Delta t^* m)} \tag{64}$$

Accordingly, in terms of the Newton-Raphson method the equation (60) may be expressed and analyzed via the following equation (66):

$$(\Delta t^* m)_{n+1} = (\Delta t^* m)_n - ((T_c(k) + \text{Conduction}^*(\Delta t^* m)_n) - T_h(k))e^{-b^*(\Delta t^* m)_n} + T_h(k) - T_c(k+m))/((\text{Conduction}^*(1+(-b)(\Delta t^* m)_n) + (-b)^*(T_c(k) - T_h(k)))e^{-b^*(\Delta t^* m)_n}) \tag{66}$$

In the equation (66) the term "$\Delta t^* m$" represents the time required to either overheat or cool down the particular pressure plate 46, 48, or 50 to the temperature "$T_c(k+m)$" which may be defined as the threshold temperature 54. The equation (66) may be coded and programmed into the controller 52 for subsequent iterative real-time analysis and predictive management of clutch thermal loads. The initial guess for the term "$\Delta t^* m$" in the programmed equation (66) may be selected from a predefined range of values, for example 0-45 seconds.

Consistent with an earlier description, the threshold temperature 54 of the clutch 28, 30 may also include separate first and second threshold values 54-1 and 54-2, such that the amount of time necessary for the particular pressure plate 46, 48, or 50, or the clutch facing 32-1, 34-1, to over-heat as well as to cool-off may be determined by the controller 52. The first and second threshold values 54-1 and 54-2 of the clutch 28 or 30 may be determined via a computational method or empirically during testing of the particular clutch and/or the DCT 18. Furthermore, the equation 60 may then be programmed into the controller 52 for real-time analysis of the rate of thermal energy influx into the particular clutch 28, 30. Moreover, the controller 52 may then be used for predictive determination of the amount of time remaining to reach the first and second threshold temperature values 54-1 and 54-2 for subsequent initiation of thermal protection measure(s) of the DCT 18.

The controller 52 is also programmed to ascertain whether the predicted amount of time remaining until the clutch 28 or 30 reaches the threshold temperature 54 is within a predetermined range of time 68. The range of time 68 may be based on clutch design criteria and/or empirically derived data and be programmed into the controller 52. The controller 52 is further programmed with an algorithm configured to activate an indicator 70 configured to signal to the operator of the vehicle 10 that the predicted amount of time remaining until the clutch 28 or 30 reaches the threshold temperature is within the range of time 68.

The indicator 70 may be an audible signal and/or a visual display. The visual display may include a communicated request for an operator of the vehicle 10 to increase vehicle speed or apply the vehicle brake, or apply and hold vehicle brake when the amount of time remaining until the clutch 28 or 30 reaches the first threshold value 54-1 is within the predetermined range of time 68. The visual display may also include a communicated request for the operator to release vehicle brake when the temperature of the subject clutch is reduced below the second threshold value 54-2. The indicator 70 may additionally include a coded message stored in the controller 52 and configured to be retrieved on demand.

The controller 52 may also be configured to regulate operation of the DCT 18 such that energy input into the particular clutch 28 or 30 is reduced when the predicted amount of time "$\Delta t^* m$" remaining until the clutch reaches the first threshold value 54-1 is within the predetermined range of time 68. To thus reduce energy input to the particular clutch 28 or 30 the controller 52 may disengage the subject clutch. The controller 52 may be additionally configured to regulate operation of the DCT 18 to permit additional energy input to the particular clutch 28 or 30 when the temperature of the subject clutch is reduced below the second threshold value 54-2.

Figure 3:
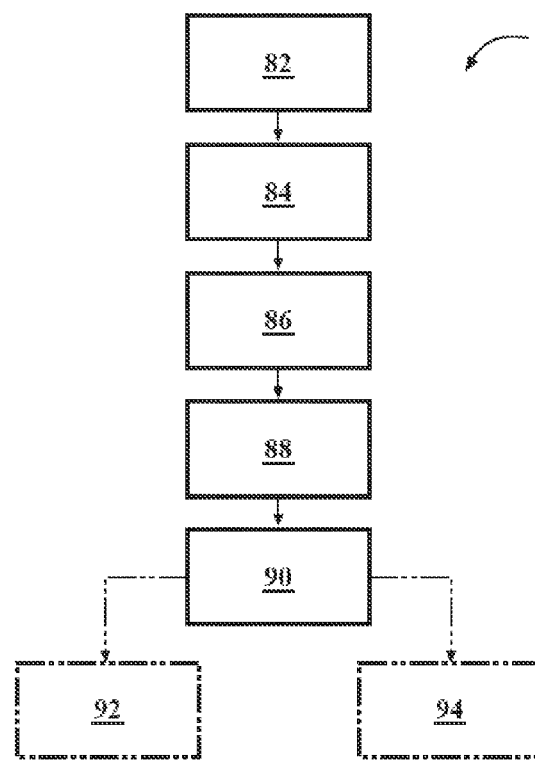
FIG. 3 is a flow chart illustrating a method of managing clutch thermal loads in the DCT depicted in FIGS. 1-2.

FIG. 3 depicts a method 80 of managing clutch thermal loads in the DCT 18, as described above with respect to FIGS. 1-2. The method commences in frame 82 with assessing operation of the DCT via the controller 52. From frame 82, the method proceeds to frame 84, where the method includes ascertaining via the controller 52 a mode of operation of the clutch 28 or 30 that is presently used to either launch the vehicle 10 or shift the DCT 18 to a succeeding gear ratio. After frame 84, the method advances to frame 86 where the method includes predicting via the controller 52, in response to the ascertained operation of the subject clutch 28 or 30, the amount of time remaining until the clutch reaches the threshold temperature 54.

As described above with respect to FIG. 1, the controller 52 may be programmed to predict the amount of time remaining until the subject clutch 28 or 30 reaches the threshold temperature 54 via the Newton-Raphson method. As additionally described with respect to FIG. 1, the Newton-Raphson method provides an iterative real-time analysis that may be used by the method for predictive management of clutch thermal loads.

From frame 86 the method moves on to frame 88. In frame 88 the method includes ascertaining via the controller 52 whether the predicted amount of time remaining until the subject clutch 28 or 30 reaches the threshold temperature 54 is within the predetermined range of time 68. After frame 88, the method proceeds to frame 90 where it includes activating the indicator 70 to signal that the predicted amount of time remaining until the subject clutch reaches the threshold temperature 54 is within the predetermined range of time 68.

Following frame 90 the method may advance to frame 92 where it may additionally include regulating operation of the DCT 18 such that energy input to the subject clutch is reduced when the predicted amount of time remaining until the clutch reaches the first threshold value 54-1 is within the predetermined range of time 68. In frame 92 the controller 52 may disengage the subject clutch 28 or 30 to reduce the energy input thereto. Alternatively, following frame 90 the method may advance to frame 94 where it may additionally include regulating operation of the DCT 18 to permit additional energy input to the subject clutch 28 or 30 when the temperature of the clutch is reduced below the second threshold value 54-2.

The described method is intended to facilitate increased durability and extended operating life for the DCT 18 and specifically of the clutches 28 and 30 by predicting excessive thermal loading on the subject clutches prior to such heat detrimentally affecting the clutch facings. Accordingly, the method may be used to reduce the likelihood of unpleasant clutch odor being generated due to extended thermal loading and ensure extended reliable operation of the DCT 18.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for managing clutch thermal loads in a multi-speed dual-clutch transmission (DCT) that is paired with an internal combustion engine in a vehicle, the method comprising:
   assessing operation of the DCT;
   ascertaining a mode of operation of a clutch in the DCT;
   predicting, in response to the ascertained mode of operation of the clutch, an amount of time remaining until the clutch reaches a threshold temperature, wherein said predicting the amount of time remaining until the clutch reaches the threshold temperature includes employing the Newton-Raphson method to approximate the amount of time remaining;
   ascertaining whether the predicted amount of time remaining until the clutch reaches the threshold temperature is within a predetermined range of time; and
   activating an indicator configured to signal that the predicted amount of time remaining until the clutch reaches the threshold temperature is within the predetermined range of time,
   wherein the threshold temperature is a first value indicative of the clutch being overheated, the method further comprising regulating the operation of the DCT such that energy input to the clutch is reduced when the predicted amount of time remaining until the clutch reaches the first value is within the predetermined range of time.

2. The method of claim 1, wherein the indicator is at least one of an audible signal and a visual display.

3. The method of claim 2, wherein the visual display includes a request for an operator of the vehicle to at least one of i) increase vehicle speed or apply the vehicle brake, and ii) apply and hold vehicle brake.

4. The method of claim 2, wherein the visual display includes a request for an operator of the vehicle to release the vehicle brake.

5. The method of claim 1, wherein said regulating operation of the DCT such that energy input to the clutch is reduced includes disengaging the clutch.

6. The method of claim 1, wherein the threshold temperature is a second value indicative of the clutch being substantially cool, further comprising regulating operation of the DCT to permit additional energy input to the clutch when the temperature of the clutch is reduced below the second value.

7. The method of claim 1, wherein each of said assessing operation of the DCT, ascertaining the mode of operation of the clutch in the DCT, predicting the amount of time remaining until the clutch reaches the threshold temperature, ascertaining whether the predicted amount of time remaining until the clutch reaches the threshold temperature is within the predetermined range of time, and activating the indicator is accomplished via a controller.

8. The method of claim 1, wherein the clutch is one of an odd-ratio clutch and an even-ratio clutch.

9. A vehicle comprising:
   an internal combustion engine configured to generate engine torque;
   a drive wheel configured to interface with a road surface;
   a multi-speed dual-clutch transmission (DCT) operatively connected to the engine and configured to transmit engine torque to the drive wheel; and
   a controller configured to:
      assess operation of the DCT;
      ascertain a mode of operation of a clutch in the DCT;
      predict, in response to the ascertained mode of operation of the clutch, an amount of time remaining until the clutch reaches a threshold temperature via employing the Newton-Raphson method to approximate the amount of time remaining;
      ascertain whether the predicted amount of time remaining until the clutch reaches the threshold temperature is within a predetermined range of time; and
      activate an indicator configured to signal that the predicted amount of time remaining until the clutch reaches the threshold temperature is within the predetermined range of time,
      wherein the threshold temperature is a first value indicative of the clutch being overheated, and the controller is additionally configured to regulate operation of the DCT such that the energy input to the clutch is reduced when the predicted amount of time remaining until the clutch reaches the first value is within the predetermined range of time.

10. The vehicle of claim 9, wherein the indicator is at least one of an audible signal and a visual display.

11. The vehicle of claim 10, wherein the visual display includes a request for an operator of the vehicle to at least one of i) increase vehicle speed or apply the vehicle brake, and ii) apply and hold vehicle brake.

12. The vehicle of claim 10, wherein the visual display includes a request for an operator of the vehicle to release the vehicle brake.

13. The vehicle of claim 9, wherein the controller regulates operation of the DCT such that energy input to the clutch is reduced by disengaging the clutch.

14. The vehicle of claim 9, wherein the threshold temperature is a second value indicative of the clutch being substantially cool, and the controller is additionally configured to regulate operation of the DCT to permit additional energy input to the clutch when the temperature of the clutch is reduced below the second value.

15. The vehicle of claim 9, wherein the clutch is one of an odd-ratio clutch and an even-ratio clutch.

16. The vehicle of claim 9, wherein the indicator additionally includes a coded message stored in the controller and configured to be retrieved on demand.

* * * * *